Patented Sept. 26, 1939

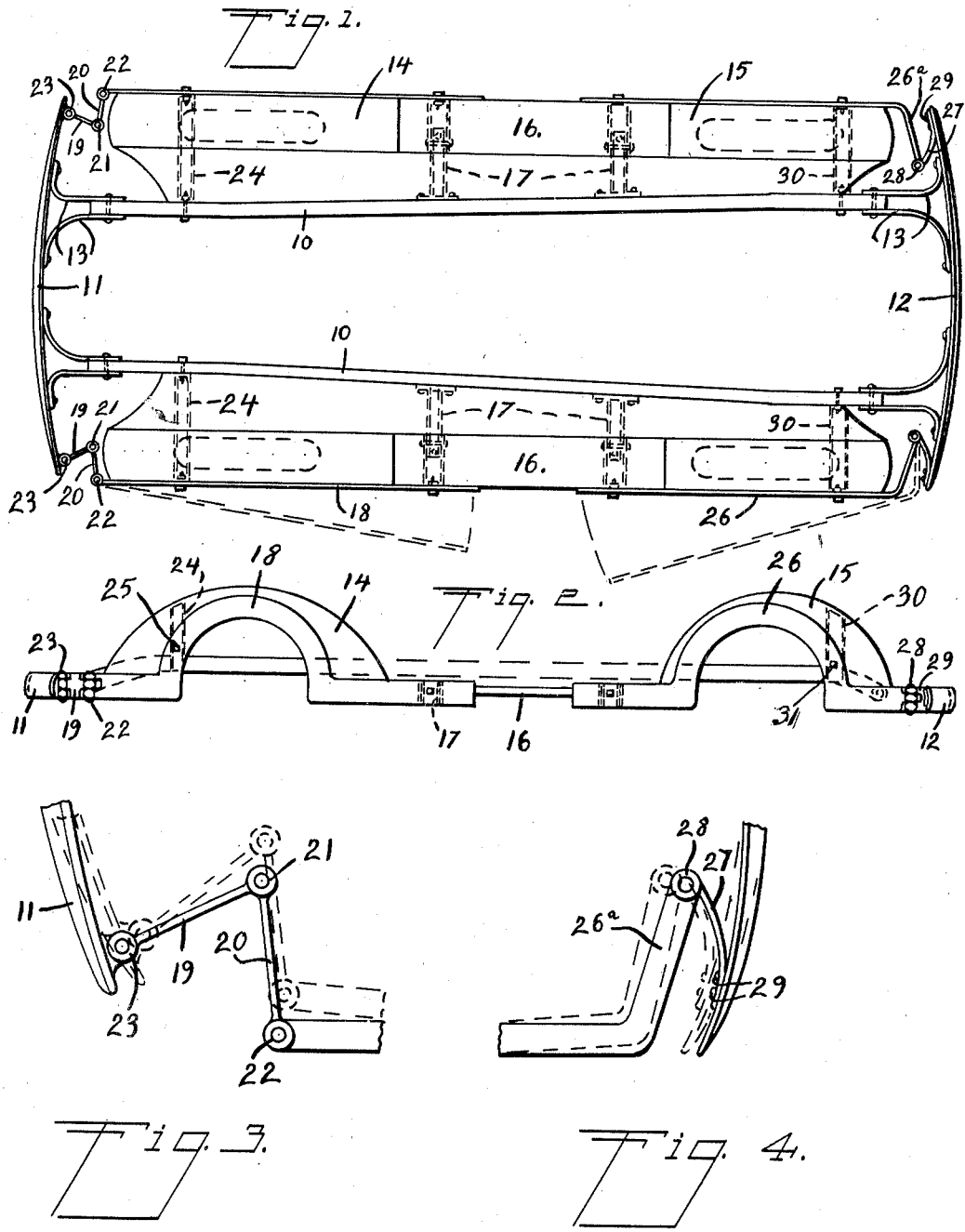

2,174,252

UNITED STATES PATENT OFFICE 2,174,252

VEHICLE GUARD

John W. Altmyer, Waseca, Minn.

Application April 2, 1938, Serial No. 199,607

4 Claims. (Cl. 293—57)

This invention relates generally to vehicle guards, and particularly to side protection bars adapted for attachment to automobiles for protecting fenders and running boards.

An important object of the invention is to provide side protection bars for automobiles for protecting fenders and running boards from scratches and impacts that may be received.

Another object of the invention is to provide a device of this character that is decorative and that extends generally longitudinally of the vehicle a portion of the length thereof from front and rear.

Another object is to provide a device of this character of stout, slightly resilient metal bars or channel pieces secured marginally along the free edges of the fenders and running boards of the vehicle.

Another object of the invention is to provide a device of this character wherein the ends adjacent the respective bumper ends are flexibly secured to said bumper ends by flexible, resilient connections and wherein substantially free movement of the bumper ends and side protection bar ends is effected without materially affecting said bumper ends and bars respectively.

Another object is to provide a device of this character wherein inward movement of the ends of the side protection bars tends to move the adjacently connected bumper ends inwardly longitudinally relative to the length of the vehicle.

Still another object of the invention is to provide a device of this character wherein the connections between the respective side protection bars and bumpers have hinged joints interposed therein to increase the flexibility of said connections.

A further object of the invention is to provide a device of this character of simple and durable construction and of relatively low manufacturing cost.

Numerous other objects and advantages of the invention will be apparent as it is better understood from the following detailed description, which, taken in connection with the accompanying drawing, discloses a preferred embodiment thereof.

Referring to the drawing:

Figure 1 is a plan view of an automobile chassis frame having front and rear bumpers, front and rear fenders with running boards therebetween and having my side protection bars attached thereto.

Figure 2 is a side elevation of same.

Figure 3 is an enlarged partial plan of the front connection between the respective ends of the front bumper and front protection bars.

Figure 4 is an enlarged partial plan of the rear connection between the respective ends of the rear bumper and rear side protection bars.

Referring more particularly to the drawing, which illustrates a preferred embodiment of my invention, reference numeral 10 indicates the side members of an automobile chassis frame which extend longitudinally of the vehicle. A front bumper 11 and a rear bumper 12 are secured to the front and rear ends respectively of the members 10 by respective bumper arms 13 secured to the respective parts by bolts or the like, said bumpers extend transversely of the vehicle at the front and rear thereof and protect the vehicle from impacts from the front and rear. Front fenders 14 and rear fenders 15 are suitably secured to the vehicle frame and said vehicle is provided with running boards 16 at the sides thereof between the respective front and rear fenders, said running boards being mounted on and secured to braces 17 beneath same.

Front side protection bars 18 extend generally longitudinally of the vehicle along the free edges of the front fenders 14 and adjacent portions of the free edges of the running boards 16. Both front side protection bars 18 are similarly constructed and formed of suitable strap or channel bars and are similarly attached to the fenders and running boards. The rear ends of bars 18 are secured to the running board braces 17. The front ends of bars 18 extend slightly forwardly of the fenders 14 and are flexibly connected with the adjacent ends of the bumper 11 by connecting members 19 and 20 which are connected together by a hinge joint 21 at the adjacent ends thereof. The free end of each member 20, relative to the hinge 21, is hingedly secured to the forward end of the respective bar 18 by a joint 22, and the free end of each member 19, relative to the hinge 21, is hingedly secured to the respective bumper end by a joint 23. Inward movement of the front end of the bars 18, due to impact, results in the movements indicated for the respective connected parts by dotted lines in Figure 3, viz., the bumper ends tend to be drawn rearwardly or inwardly relative to the length of the vehicle. It will be noted that both the bumper ends and the adjacent connected ends of the side bars 18 may move to a limited extent independently of each other but support each other through the flexible connections. Beneath each front fender 14 is a brace 24 conforming substantially to the shape of the fenders, the outer ends of said braces being secured to the respective side bars 18 by bolts 25 and said bars 18 tend to fulcrum upon said ends upon inward movement of said bars 18 due to an impact against the front ends thereof.

Rear side protection bars 26 extend generally longitudinally of the vehicle along the free edges of the respective rear fenders 15 and adjacent portions of the free edges of the respective running boards 16. The forward ends of the bars 26 are secured to the rear running board braces 17 and the rear end portions 26a of said bars 26 are turned inwardly and slightly rearwardly. The rear ends of bars 26 are connected with the adjacent ends of the rear bumper 12 by rearwardly and outwardly curved resilient connecting members 27, the inner ends thereof being connected with the respective ends of bars 26 by hinges or joints 28 and the outer ends of said members 27 being connected to the respective bumper ends by bolts 29 or the like. Inward movement of the rear ends of bars 26 tend to pull the respective bumper ends longitudinally forwardly or inwardly relative to the length of the vehicle. It will be noted that both the bumper ends and the adjacently connected ends of the bars 26 may move to a limited extent independently of each other due to the flexibility of the connection therebetween, but are mutually supported through said connection. Beneath each rear fender 15 is a brace 30 conforming substantially to the shape of the fenders, the outer ends of said braces being secured to the respective side bars 26 by bolts 31 and said bars 26 tend to fulcrum on said ends upon impact laterally of the rear end portions thereof.

It is thought that the invention and many of its attendant advantages will be understood from the foregoing description and it will be apparent that various changes may be made in the form, construction and arrangement of the various parts without departing from the spirit and scope of the invention or sacrificing all of its material advantages, the form hereinbefore described being merely a preferred embodiment thereof.

Having thus described my invention what I claim is:

1. In a device of the class described, the combination with an automotive vehicle having front and rear bumpers, fenders and running boards supported on a chassis frame, of side protective bars for said fenders secured along the free edges thereof and adjacent free edges of the running boards, said protective bars having the inner ends thereof, relative to the length of the vehicle, secured to running board braces and having the outer ends thereof extending longitudinally outwardly of the fenders, and flexible, resilient connections connecting the said outer ends of the side protective bars with adjacent bumper ends, said connections comprising a plurality of short pieces hinged together and having their free ends, relative to the hinged ends, hingedly secured to respective bumper ends and ends of the protective bars.

2. The combination with an automotive vehicle having front and rear bumpers, fenders and running boards supported on a chassis frame, of protective bars for said fenders secured along the sides of the free edges thereof and adjacent edges of the running boards, said protective bars having the inner ends, relative to the length of the vehicle, secured to running board braces and having the opposite ends extending longitudinally outwardly of the fenders, and flexible, resilient connections connecting the said outer ends of the protective bars with adjacent bumper ends respectively.

3. The combination with an automobile having front and rear bumpers, fenders and running boards supported on a chassis frame, of side protection bars for said fenders secured along the free edges thereof, the outer ends of said bars, relative to the length of the automobile, extending outwardly longitudinally of the respective fenders and being inturned, and longitudinally outwardly and laterally extending connecting members, each of said connecting members having one end secured to a bumper end and the opposite end hingedly secured to the adjacent inturned end of the respective side protection bar.

4. The combination with an automobile having front and rear bumpers, fenders and running boards supported on a chassis frame, of side protection bars for said fenders and running boards secured along the free edges thereof, the outer ends of said bars, relative to the length of the automobile, being inturned adjacent the outer longitudinal ends of the respective fenders, and flexible resilient connections connecting the inturned ends of the bars and respective adjacent bumper ends.

JOHN W. ALTMYER.